Aug. 7, 1928.                     1,680,270

F. D. WENN ET AL

KNOBBED NUT

Filed July 16, 1927

FLOYD D. WENN
BRUCE M. STANNARD  INVENTORS

BY *Louis Ilmer*
ATTORNEY.

Patented Aug. 7, 1928.

1,680,270

UNITED STATES PATENT OFFICE.

FLOYD D. WENN AND BRUCE M. STANNARD, OF BINGHAMTON, NEW YORK, ASSIGNORS TO THE BREWER-TITCHENER CORPORATION, OF CORTLAND, NEW YORK, A CORPORATION OF NEW YORK.

KNOBBED NUT.

Application filed July 16, 1927. Serial No. 206,194.

This invention more particularly relates to improvements in the design and fabrication of ornamental threaded nuts such as prop nuts and the like equipped with an enlarged knob or other encasement behind which the nut body is partially concealed for decorative purposes.

Composite or built up nuts of this kind are extensively used to screw on and trim the free ends of vehicle top props which props are conventionally fastened to the opposite sides of the vehicle and respectively serve as fulcrumed support for carrying the complementary lower ends of their collapsible top structure. Prop nuts also find a rather wide application for holding in place either or both ends of other top members, likewise ornamental dummy joints such as are now being largely employed to embellish non-collapsible or closed automobile tops, and for many similar purposes.

One object of the present invention is to provide for a simple durable nut of the character indicated and also to devise an interlocked connection of the non-slip type between the nut body and a chambered sheet metal knob adapted to positively hold these component elements in fixed interlocked relation while the nut is being manipulated. When used upon motor vehicles, the built-up knob elements found in the conventional type of prop nuts are likely to loosen up under long repeated vibration from road jars and this in turn tends to set up obnoxious rattle about the car. It is the further purpose of the present invention to overcome this defect and insure a rattle-proof joint between the nut and its knob. An additional aim is to provide for an economical method of making improved prop nuts and the like; to this end and the accomplishment of other new and useful results, this invention consists in novel constructive features, organization and the making up of its several elements, all of which will hereinafter be described in detail.

Reference is had to the accompanying one sheet of drawings which are illustrative of a specific embodiment of our invention more particularly as applied to motor vehicles, in which like characters of reference indicate like parts in the several views, and in which drawings:

Fig. 3 illustrates an assembly of the prop nut body together with its decorative knob while

Referring to the constructive details of our product and its characteristic application, the letter $A_1$ denotes a closed automobile top such for instance as is commonly used on a coach or sedan type of motor vehicle while $A_2$ represents the body thereof. There is here shown a dummy joint $A_3$ whose lower and upper apertured ends may be mounted upon a conventional prop iron such as $A_4$ preferably secured by leg flanges $A_5$ to the respective body sides. It will be obvious that such irons may be similarly used in connection with folding tops to carry the main support bow or the like and that the present disclosure is merely illustrative of the general purposes of our improved nut.

The outer or free end of said prop iron $A_4$ is usually provided with overhanging screw threads $A_6$ and our knobbed nut designated as a whole by B, may be screwed or otherwise locked thereon to hold in place a top member such as $A_3$ or its bow socket equivalent.

Figure 1:
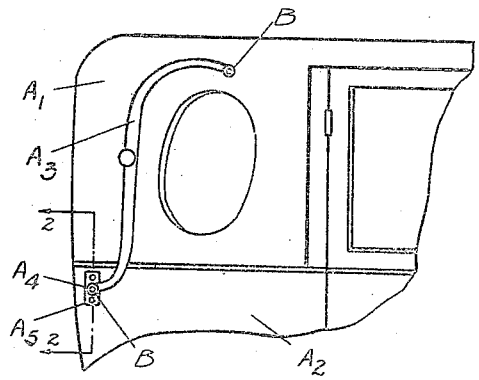
Fig. 1 is an elevational view of our prop nut as applied in holding a dummy joint to a coach or sedan type of motor vehicle top.
Figure 2:
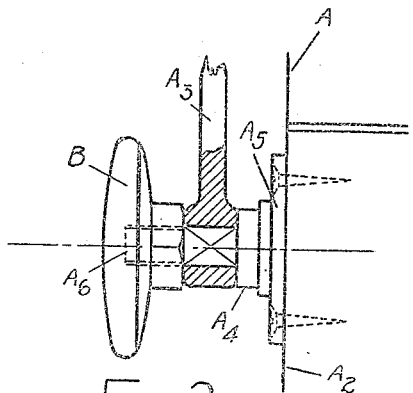
Fig. 2 represents an enlarged detail of a knobbed nut assembled upon its prop iron as taken along line 2—2 of Fig. 1.
Figure 3:
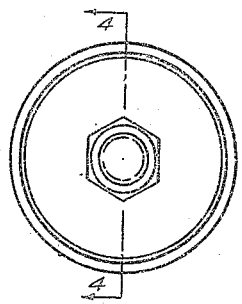
Figure 4:
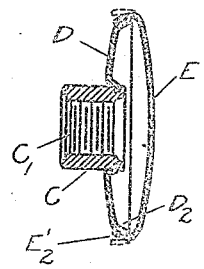
Fig. 4 is a transverse section thereof as taken along line 4—4 of Fig. 3.
Figure 5:
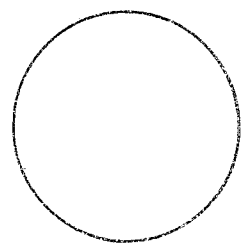
Fig. 5 is an end view of a plain circular contour that may be given to the crown plate or cover face of a chambered knob.
Figure 6:
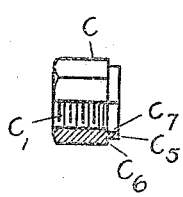
Figs. 6 and 7 show constructive details of the nut body of our device.
Figure 7:
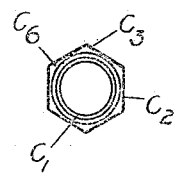

The completed article B as exemplified in a sheet metal knob product and shown assembled in Figs. 3 and 4, comprises a nut body C adapted to fixedly engage a cup-shaped backing disc D and about the periphery of which disc may be crimped a crown plate E.

Taking up first a detailed description of the nut element of our device, its elongated body C is preferably turned up and tapped as a screw machine product out of brass rod or other non-ferrous metal stock which facilitates production and also serves to make the nut rust-proof; this body may be drilled and tapped with a longitudinally disposed thread $C_1$ adapted to engage a stud such as $A_6$. The external wrench gripping surface $C_2$ is here shown as of hexagon contour but it may also be given a square or any other suitable polygonal or eccentric-like cross-sectional profile adapted to partially or wholly encompass the thread axis; one or more uneven surface projections or high points such as $C_3$ are thereby made to extend radially beyond the hex flats $C_2$ or similar innermost point of the profile that may be given the nut. In order to economize upon material, the maximum diametral dimension of all our finished nut portions are kept within the size of said polygonal stock, and the preferred knob attachment element is afforded by undercutting said stock. To this end, one end of said nut body may further be provided with an annular neck or tubular extensions $C_5$ whose outside diameter is preferably shaped up by lathe turning said projection $C_3$ down to form a nut shoulder $C_6$ and the resulting upstanding face is kept in a squared flat relation with respect to the nut axis. The inside diameter of said extension may be counterbored as at $C_7$ for the purpose of reducing its thickness and facilitating the riveting thereof as will appear presently.

Figure 8:
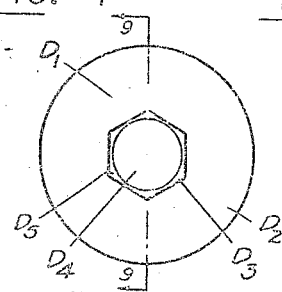
Figs. 8 and 9 show the manner in which the backing disc of our knob may be formed up prior to assembly upon said nut body.
Figure 9:
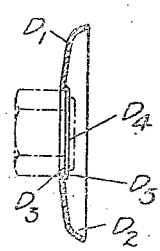

The backing member D detailed in Figs. 8 and 9, comprises a centrally disposed disc portion $D_1$ which is here shown as having a cupped up rim $D_2$ flaring outwardly toward its periphery. The flat face of said disc may be provided with a depressed pocket or other type of socket $D^3$ whose outline is preferably made to conform rather closely to a portion of the polygonal external surface shape given to the nut body C; the base of said socket may then be swaged or deformed into intimate contact with the polygonal external surface of the nut to be securely locked thereto. Said socket may also be provided with a centrally located aperture of any suitable shape such as $D_4$ adapted to fixedly secure the nut body in its interlocked position; in the present instance such securement is afforded by the use of a circular aperture which is intended to receive the headless extension $C_5$ of said nut in the fashion indicated by dotted lines in Fig. 9, said aperture diameter being kept sufficiently small with respect to the contour of the socket $D_3$ to afford an offset ledge face $D_5$ disposed substantially parallel to the disc surface and intended to abut the nut shoulder $C_6$.

After assembling the body C into the disc $D_1$ with the body surface interlocked with said socket, the neck $C_5$ may then be expanded, riveted, swaged, prick punched or otherwise secured to said ledge $D_5$ in the manner indicated for instance by Fig. 4. The embedded prop nut elements thereby become securely joined together as a unit, when the body C may be initially screwed upon a suitable thread through the medium of said disc D and tightly brought home by the use of a wrench applied to the body hex surface.

It is thought the purpose and application of our improved prop nut will be obvious from the preceding description. It will also be understood that various changes in the disclosed arrangement of details may be resorted to, all without departing from the spirit and scope of the invention heretofore described and pointed out in the appended claims.

Claims:

1. In a knobbed nut, an internally screw threaded nut body member provided with a tubular extension and a polygonal external surface, and a backing disc having an apertured socket formed therein, the aperture being shaped to fit the extension of the nut and the extension being locked into engagement with the margin of the aperture, and the base of the socket fitting the polygonal surface of the nut when swaged in place.

2. In a knobbed nut, an internally screw threaded nut body member provided with a tubular extension and a polygonal external surface, a backing disc having an apertured socket formed therein, the aperture being shaped to fit the extension of the nut and the extension being locked into engagement with the margin of the aperture and the base of the socket fitting the polygonal surface of the nut when swaged in place, and a crown plate engaging the periphery of the backing disc.

In testimony whereof, we have signed our names to this specification.

FLOYD D. WENN.
BRUCE M. STANNARD.